April 5, 1938.    O. LINDELL    2,112,852
ELECTRIC MOTOR
Original Filed March 9, 1936    2 Sheets-Sheet 2

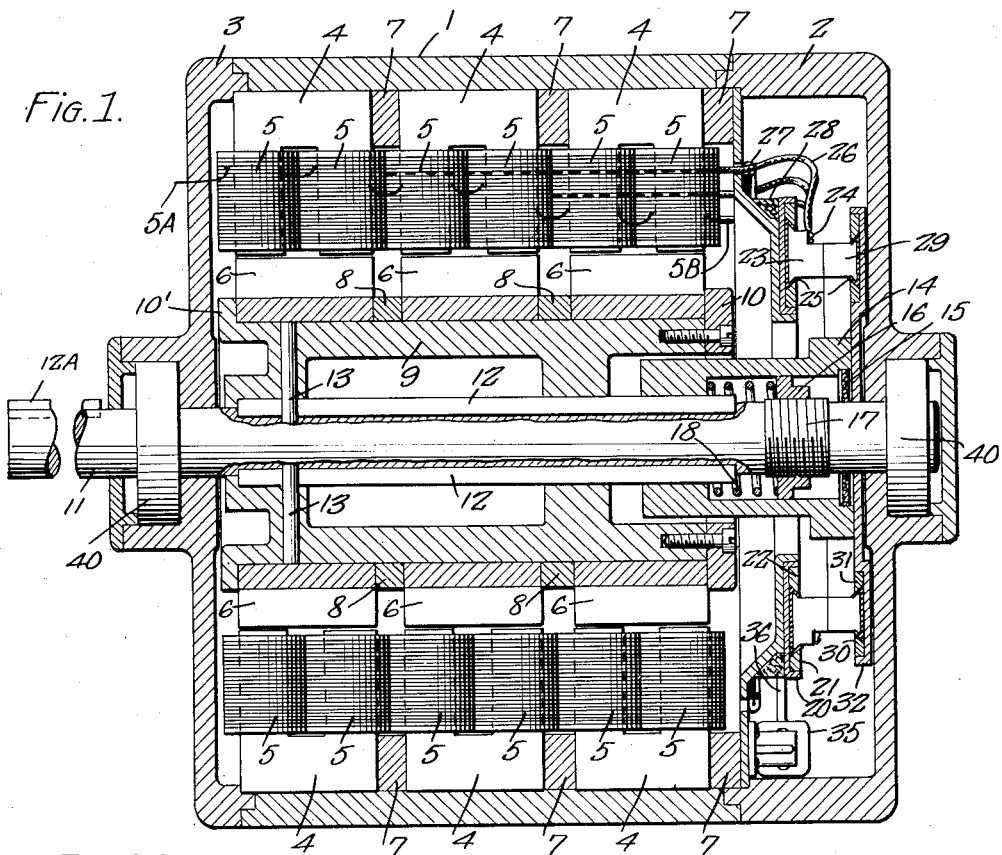

Oliver Lindell  INVENTOR.

Patented Apr. 5, 1938

2,112,852

UNITED STATES PATENT OFFICE 2,112,852

ELECTRIC MOTOR

Oliver Lindell, Shawnee, Okla.

Application March 9, 1936, Serial No. 67,952
Renewed November 15, 1937

7 Claims. (Cl. 172—36)

My invention relates to electric motors, and more especially to motors in which the rotor, or revolving member, has no coils or other form of winding.

An object of my invention is to provide a motor in which the stator or stationary member is provided with a series of novel electro-magnets which, when energized in sections by the proper electric current, causes rotation of the rotor without the necessity for any winding on the rotor, thereby effecting simplicity in operation.

A further object is to provide a motor which is so constructed as to permit of ease in assembly and disassembly, thereby making the initial construction and maintenance both simple and economical.

A further object is to provide novel contact rings for the passage of electric current, these rings being so constructed as to permit a constant and predetermined tension of contact to be exerted at all times, thereby preventing the possible contingency of failure in the electrical current supplied to the motor because of a poorly maintained contact within the motor itself.

A further object is to provide a motor of this type in which reversal of the direction of rotation is accomplished by means of novel self contained mechanism for this purpose thereby eliminating the necessity for external reversing mechanism entailing additional working parts.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a vertical sectional view of the motor constructed in accordance with the invention, with parts in elevation.

Figure 2 is a detail perspective view showing the stator, electro-magnet pole pieces, and the sectional rotor with the armatures of the sections shown in stepped or staggered relation.

Figure 3 is a diagrammatic view showing a plurality of the magnetic pole pieces of the stator and the corresponding armatures of a section of the rotor in position for magnetic attraction.

Figure 12 is a wiring diagram similar to Figure 9 but showing each magnet shunting contact bridging three magnet contacts.

Figure 4:
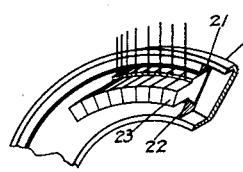
Figure 4 is a detail perspective view showing the magnet contact ring with the magnet contacts assembled therewith.

Referring now to the drawings in which like characters of reference designate similar parts in the various views, 1 designates the stator shell, the same being of substantially hollow cylindrical form and having at each end a circular lip or flange to make union with a head member 2 on one end and a head member 3 on the opposite end. The head members 2 and 3 are substantially circular in shape and each is provided with a flange as shown for increasing the combined length of the assembled parts 1, 2, and 3. Each head member is provided on the outer face with a cavity, substantially as shown, for the insertion and retention of the bearings 40 of a rotor shaft 11.

In the stator are mounted laminated U-shaped pole pieces 4 having thereon coils 5. The pole pieces are arranged in annular sections, and the annular sections of pole pieces are separated by spacer rings 7. There are three annular sections of pole pieces A, B, and C shown in the present embodiment of the invention, although any desired number of sections may be employed.

The rotor comprises annular laminated armature sections 6 separated by spacer rings 8. Preferably there are three armature sections corresponding to the three annular sections of pole pieces. Each section is provided with ribs which are attracted by the electro-magnets of the corresponding section of pole pieces of the stator to impart rotation to the rotor as will be hereinafter more fully described. The rotor sections are fixed upon a hollow cylindrical core member 9 having at one extremity a removable ring shaped member 10 and having at the other extremity an integral ring shaped member 10', these members serving to retain the sections and the spacer rings in proper relative position upon the core member.

The rotor sections are rigidly fixed upon the rotor shaft 11 by means of keys 12 and locking pins 13 passed through the core member 9, through the keys, and into the rotor shaft. One end of the rotor shaft is equipped with a key 12—A by which a pulley or gear is rigidly fixed to the shaft. Near the opposite end of the shaft is located a hollow cylindrical casing 14 which houses a nut 16 that engages screw threads 17 formed on the shaft.

A helical spring 18 is confined on the shaft under tension between the nut and the closed end of the casing 14, said closed end being provided with a circular opening to receive the shaft and with slots to receive the keys 12 so that the casing 14 is splined on the shaft and is yieldably pressed longitudinally of the shaft by the tension of the spring 18 for a purpose which will presently appear. The casing 14 is provided in its open end near the head 2 with a gasket 15 which prevents leakage of lubricant from the interior of the casing.

Figure 11:
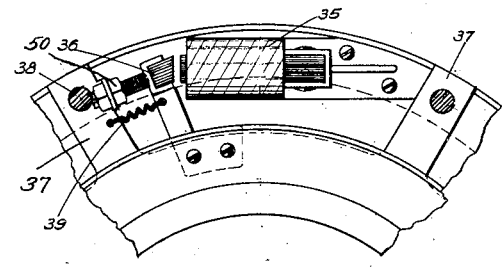
Figure 11 is a fragmentary elevation showing the electro-magnet and its armature forming the self contained reversing mechanism of the motor.

The numeral 19 indicates a dished annular supporting plate which is rigidly fixed to an outer spacer ring 7 by means of rod-like body bolts 38, best shown in Figure 11, passing through the entire motor in a longitudinal direction parallel to the shaft 11 and spaced at proper intervals to insure rigid construction. An annular flange projects from the inner periphery of the supporting plate and seated on this flange for limited shifting movement is a magnet contact retaining plate 20 of channel contour, best shown in Figure 4. Retaining rings 21 and 22 are mounted on the retaining plate 20, each having one edge beveled to retain magnet contacts 23, shown in Figure 5, which are insulated from contact with the retaining plate and the retaining rings by rings 25 of insulating material, best shown in Figure 1.

Figure 5:
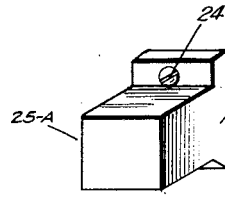
Figure 5 is a perspective view of one of the magnet contacts and its insulation and lead wire fastening screw.

Each magnet contact 23 is insulated from the next adjacent magnet contact by insulating material 25—A, best shown in Figure 5. Each magnet contact is provided with a screw 24 for securing the lead wire 26 from its respective electro-magnet. The lead wires 26 are insulated from each other by a notched insulating ring 27 carried by the retaining plate 20, as best shown in Figure 1.

A ring of felt 28, or similar material, is supported between the dished portion of the supporting plate and the marginal portion of the retaining plate 20 for properly lubricating these plates since, as above stated, there may be relative movement effected between these plates which movement will take place when the direction of rotation of the rotor is reversed, as will presently be described.

The numeral 29 indicates magnet shunting contacts by which electrical contact is made with the electro-magnet coils 5 through the magnet contacts 23. 30 and 31 indicate wedge-shaped retaining rings similar to the retaining rings 21 and 22, and which serve to retain the magnet shunting contacts 29 on the channeled supporting plate 32. The supporting plate 32 is rigidly fastened to the casing 14 and revolves as a unit with the rotor.

Positive electrical contact between the magnet contacts 23 and magnet shunting contacts 29 is maintained by the adjustment of the nut 16, with resultant tensioning of the spring 18 to force the casing and the magnet shunting contacts longitudinally of the rotor shaft and establish positive wiping engagement between the magnet contacts 23 and magnet shunting contacts 29.

Figure 6:
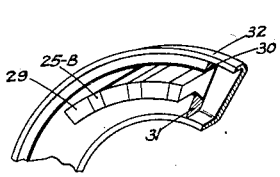
Figure 6 is a detail perspective view showing the construction of the magnet shunting ring with the magnet shunting contacts separated by insulating blocks thereon.

Each magnet shunting contact 29 is insulated from the next adjacent magnet shunting contact by an insulating block 25—B, best shown in Figure 6. The magnet shunting contacts are insulated from contact with the supporting plate 32 and retaining rings 30 and 31, by rings 25' of insulating material, best shown in Figure 1.

Figure 8:
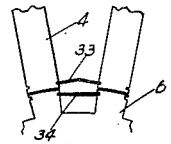
Figure 8 is a fragmentary elevation showing the retaining members for mounting the magnet coils on the pole pieces and for holding the laminations of the rotor flush.

In Figure 8, 33 indicates bridging members inserted in grooves in the pole pieces 4 to support the coils 5 of the electro-magnets in their proper position. Bridging members 34 may be inserted between the armature ribs 6 to maintain the edges of the laminations of each rib flush.

The magnet contacts 23 are the same in number as the electro-magnets, and the radial width of each contact plus its separating insulation 25—A, is equal to the distance traveled by a rib of the rotor armature magnetically attracted by an electro-magnet of the stator.

Each magnet shunting contact is spaced from each adjacent shunting contact by an insulating block 25—B which is equal in radial width to the radial width of a magnet contact plus its insulation. The magnet shunting contacts are equal in number to the total number of electro-magnets divided by the number of annular sections of magnets in the stator and are sufficient in radial width to bridge two but not more than three of the magnet contacts as shown in Figures 9 and 12.

By radial width is meant the width of the rubbing face or contact face measured in an arc from leading edge to following edge of the rubbing face, the center of the arc coinciding with the center of curvature of the circular series of contacts.

Figure 9:
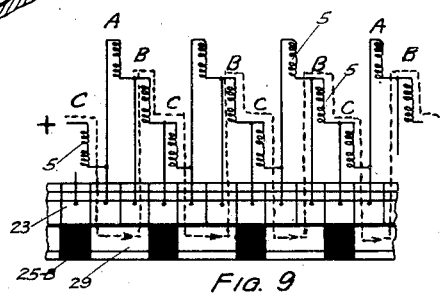
Figure 9 is a wiring diagram showing each two of the magnet contacts being bridged by a magnet shunting contact, each stepped series of three coils in the diagram representing the coils of the three stator electro-magnets aligned in a row on the stator, as shown in Figure 7.
Figure 10:
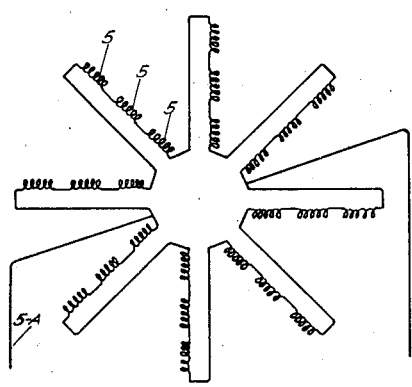
Figure 10 is a wiring diagram of the electro-magnets, each radial arm in the diagram representing the coils of three electro-magnets aligned in a row on the stator, a showing of the commutator assembly and connections thereto being omitted from this figure.

In wiring the motor the electro-magnets are connected together in series as shown in Figure 10, taps being made between each pair of magnets and the lead wires 26 connected to associated magnet contacts as shown in Figure 9. The magnet circuit is connected in parallel with the supply circuit as indicated at 5—A and 5—B, Figure 10.

The component parts of the motor work together to assure continuous rotation of the rotor as follows.

The three annular stator sections are arranged with their electro-magnets aligned longitudinally of the stator. The rotor sections are fixed on the hollow rotor core so that the ribs of the sections are staggered, that is, the ribs of one section have an angular lead over the ribs of the next succeeding section by an amount equal to one third of the angular distance between rib centers of any section. The motor is assembled with the leading edges of the armature ribs of the first section disposed at the trailing edges of the electro-magnets in the corresponding first section of the stator, the above recited arrangement of the ribs of the succeeding sections disposing these ribs in proper relation to their associated magnets, as shown in Figure 7.

Figure 7:
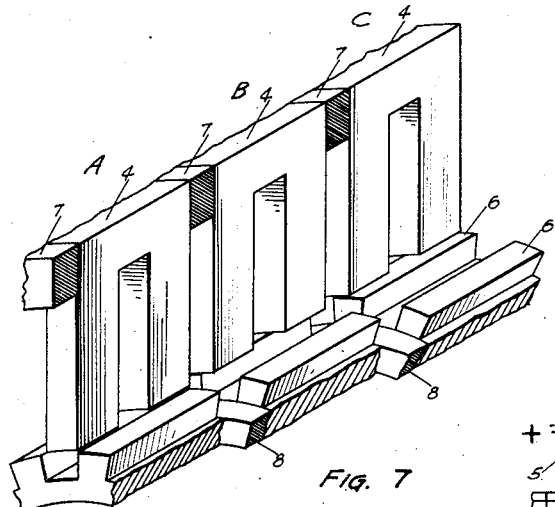
Figure 7 is a detail perspective view showing the electro-magnet pole pieces of the stator with the coils removed and the first section rotor armatures in position for magnetic attraction, and showing the second and third rotor sections with their armatures in stepped sequence with respect to the armatures of the first section.

The electro-magnets of the sections A, B, and C, of the stator, shown in Figure 7, are represented by the corresponding magnet coils A, B, and C of Figure 9. The coil A in each instance represents all of the electro-magnets of the stator section A, B represents all of the magnets of the section B, and C all of the magnets of the section C. The magnet shunting contacts 29 bridge two of the magnet contacts 23 and then three of the magnet contacts, this sequence being continuous alternately during each revolution of the rotor as may be seen by comparing Figures 9 and 12. The magnets are energized as a result of this sequence as follows.

Magnets B and C together, then C alone, C and A together, then A alone, A and B together, then B alone, and thereupon the cycle commences again.

By now referring to Figure 7 it will be seen that when the electric current is passing through all of the electro-magnets of the stator section A, the armature ribs of the corresponding rotor section will be attracted and rotary movement thereby imparted to the rotor. As the ribs near the limit of rotary movement in the desired direction under the influence of the magnets A, the armature ribs of the next succeeding rotor section will arrive in position to be attracted by their associated stator electro-magnets B. In this position of the parts the shunt contacts will bridge two of the magnet contacts and all magnets A and B are then simultaneously energized. Eventually the armature ribs of the first section of the rotor will arrive at a position at which the electro-magnets A no longer attract in the desired direction of rotation, and in this position of the parts the shunt contacts will bridge three of the magnet contacts and the electro-magnets A will be shunted out, while simultaneously the magnets B alone will remain energized to complete the angular attraction of the ribs of the corresponding section of the rotor.

In like manner the shut contacts again bridge two of the magnet contacts to energize the magnets B and C simultaneously as the ribs of the third section of the rotor arrive in position to be attracted by the magnets C. Travel of the shunt contacts eventually shunt out the magnets B and permit the current to flow through the magnets C alone. The magnets A are eventually shunted in with the magnets C as the armature ribs of the third section of the rotor arrive near their limit of attraction in the proper direction by the magnets C. Finally the magnets C are shunted out and the magnets A alone energized to again begin the cycle as above described.

Reversal of the motor is accomplished by means of a self-contained magnetic device constructed as follows. As shown in Figure 11, 35 indicates as a whole an electro-magnet assembly rigidly mounted on the end spacer ring 7. The armature 36 thereof is mounted on the magnet contact retaining plate 20. A spring 39 is secured to one of the lugs 37 through which the body bolts 38 are passed, and to the armature to hold the armature and associated retaining plate 20 at one limit of shifting movement, and adjusting means such as a screw 50 or the like may be assembled with the armature to engage the lug 37 for limiting movement of the armature under action of the spring.

Movement of the armature 36 when the electro-magnet 35 is energized shifts the plate 20 to reverse the position of the shunt contacts with respect to the magnet contacts. This reverses the order of sequence, as will be understood, that is, if the sequences were A, B, and C, in the forward direction, then in the reverse direction the sequence steps would be C, B, and A. The electro-magnets 35 may be energized by any suitable external means.

Since the operation of the motor has been described as the description of the parts progressed, it is thought that the construction and operation of the motor will be fully understood without further explanation.

What is claimed is:

1. An electric motor comprising a stator, electro-magnets thereon, rotor sections having armatures adapted to be attracted by the magnets, a cylindrical core supporting the sections, a shaft fixed to the core and journaled in the stator, an annular series of magnet contacts fixed on the stator, an annular series of magnet shunting contacts carried by the core, and means for yieldably holding the magnet contacts and the magnet shunting contacts in wiping engagement with each other.

2. An electric motor as described in claim 1, the magnet contacts being insulated from each other, the number of contacts corresponding to the number of magnets, the magnets being connected in series, and lead wires tapped into the magnet circuit between adjacent magnets and connected to associated magnet contacts.

3. An electric motor embodying a stator, electro-magnets on the stator, magnet contacts insulated from each other on the stator, a rotor shaft, a casing splined on the shaft, rotor armatures on the casing, magnet shunting contacts mounted on the casing for rotation as a unit therewith, and a helical spring in the casing urging the magnet shunting contacts against the magnet contacts, said magnet shunting contacts being adapted to shunt the electro-magnets in circuit in a predetermined sequence to progressively attract the rotor armatures.

4. An electric motor comprising a stator, electro-magnets thereon, rotor sections having armatures adapted to be attracted by the magnets, a cylindrical core supporting the sections, a shaft passing through the core, an annular series of magnet contacts fixed on the stator, a casing splined on the shaft, an annular series of magnet shunting contacts carried by the casing, a spring in the casing urging the casing longitudinally of the shaft to urge the shunting contacts into wiping engagement with the magnet contacts, said magnet shunting contacts being mounted on the casing to be shifted to vary the relative position of the shunting contacts with respect to the magnet contacts for reversing the direction of rotation of the rotor, and an electro-magnet control means operatively connected to the stator and to the magnet shunting contacts for shifting the contacts to change the direction of rotation of the rotor.

5. An electric motor comprising a stator, a plurality of electro-magnets thereon, the coils of said magnets being connected in series, a supply circuit connected in series with the magnet circuit, the magnet circuit being divided into two parallel circuits, lead wires tapped into the magnet circuit between adjacent magnets, an annular series of insulated magnet contacts on the stator, said lead wires being connected to associated magnet contacts, a rotor having armatures, and an annular series of magnet shunting contacts carried by the rotor and alternately bridging two then three of the magnet contacts to shunt the magnets in proper sequence to progressively attract the armatures and rotate the rotor.

6. An electric motor as described in claim 5 in which the rotor is formed of sections provided with rib armatures, the rib armatures of each section having a predetermined angular lead over the armatures of the next adjacent section whereby the armatures are attracted in proper sequence to impart rotation in the desired direction to the rotor.

7. An electric motor comprising a stator, electro-magnets thereon, a rotor having armature ribs adapted to be attracted by the magnets, coacting annular series of contacts having wiping engagement with each other and adapted to energize the magnets in a predetermined sequence to progressively attract the armature ribs, and an adjustable tension means for maintaining tight electrical contact between said annular series of contacts.

OLIVER LINDELL.